US006348688B1

(12) United States Patent
Vestal

(10) Patent No.: US 6,348,688 B1
(45) Date of Patent: Feb. 19, 2002

(54) TANDEM TIME-OF-FLIGHT MASS SPECTROMETER WITH DELAYED EXTRACTION AND METHOD FOR USE

(75) Inventor: Marvin L. Vestal, Framingahm, MA (US)

(73) Assignee: Perseptive Biosystems, Framingham, MA (US)

( * ) Notice: Subject to any disclaimer, the term of this patent is extended or adjusted under 35 U.S.C. 154(b) by 0 days.

(21) Appl. No.: 09/233,703

(22) Filed: Jan. 19, 1999

Related U.S. Application Data

(63) Continuation-in-part of application No. 09/020,142, filed on Feb. 6, 1998, now abandoned.

(51) Int. Cl.[7] ........................... B01D 59/44; H01J 49/00

(52) U.S. Cl. ........................ 250/287; 250/282; 250/288

(58) Field of Search ................................ 250/282, 287, 250/288

(56) References Cited

U.S. PATENT DOCUMENTS

| | | | | |
|---|---|---|---|---|
| 4,731,533 A | | 3/1988 | Vestal | 250/292 |
| 5,032,722 A | | 7/1991 | Boesl et al. | 250/287 |
| 5,118,937 A | | 6/1992 | Hillenkamp et al. | 250/282 |
| 5,144,127 A | | 9/1992 | Williams et al. | 250/287 |
| 5,202,563 A | | 4/1993 | Cotter et al. | 250/287 |
| 5,206,508 A | | 4/1993 | Alderdice et al. | 250/287 |
| 5,233,189 A | | 8/1993 | Wollnik | 250/287 |
| 5,464,985 A | | 11/1995 | Cornish et al. | 250/396 |
| 5,625,184 A | | 4/1997 | Vestal et al. | 250/287 |
| 5,627,369 A | | 5/1997 | Vestal et al. | 250/287 |
| 5,654,545 A | | 8/1997 | Holle et al. | 250/287 |
| 5,696,375 A | | 12/1997 | Park et al. | 250/287 |
| 5,734,161 A | | 3/1998 | Köster | 250/287 |
| 5,744,797 A | | 4/1998 | Park | 250/287 |
| 5,753,909 A | | 5/1998 | Park et al. | 250/287 |
| 5,854,484 A | | 12/1998 | Bergmann | 250/287 |
| 5,854,485 A | | 12/1998 | Bergmann | 250/287 |
| 6,011,259 A | * | 1/2000 | Whitehouse et al. | 250/288 |
| 6,040,575 A | * | 3/2000 | Whitehouse et al. | 250/282 |
| 6,204,500 B1 | * | 3/2001 | Whitehouse | 250/287 |

FOREIGN PATENT DOCUMENTS

| | | | |
|---|---|---|---|
| WO | WO97/48120 | 12/1997 | H01L/49/40 |

OTHER PUBLICATIONS

Boesl et al., "Reflectron time–of–flight mass spectrometry and laser excitation for the analysis of neutrals, ionized molecules and secondary fragments", *International J. of Mass Spectrometry and Ion Processes, 112*: 121–166 (1992).

D. Ioanoviciu, "The application of ion optics in time–of–flight mass spectrometry", *International J.of Mass Spectrometry and Ion Processes, 131*: 43–65 (1994).

Jacobson et al., "Applications of Mass Spectrometry to DNA Sequencing", *GATA, 8(8)*: 223–229 (1991).

McLuckey et al., "Tandem Mass Spectrometry of Small, Multiply Charged Oligonucleotides", *J. Am. Soc. Mass Spectrom, 3*: 60–70 (1992).

* cited by examiner

*Primary Examiner*—Bruce Anderson
(74) *Attorney, Agent, or Firm*—Testa, Hurwitz & Thibeault, LLP

(57) ABSTRACT

A tandem time-of-flight mass spectrometry including a pulsed ion generator, a timed ion selector in communication with the pulsed ion generator, an ion fragmentor in communication with the ion selector, and an analyzer in communication with the fragmentation chamber. The fragmentation chamber not only produces fragment ions, but also serves as a delayed extraction ion source for the analyzing of the fragment ions by time-of-flight mass spectrometry.

37 Claims, 12 Drawing Sheets

TANDEM TIME-OF-FLIGHT MASS SPECTROMETER WITH DELAYED EXTRACTION AND METHOD FOR USE

RELATED APPLICATIONS

This is a continuation-in-part of patent application Ser. No. 09/020,142, filed on Feb. 6, 1998 now abandoned, the entire disclosure of which is incorporated herein by reference.

FIELD OF THE INVENTION

The invention relates generally to mass spectrometers and specifically to tandem mass spectrometers.

BACKGROUND OF THE INVENTION

Mass spectrometers vaporize and ionize a sample and determine the mass-to-charge ratio of the resulting ions. One form of mass spectrometer determines the mass-to-charge ratio of an ion by measuring the amount of time it takes a given ion to migrate from the ion source, the ionized and vaporized sample, to a detector, under the influence of electric fields. The time it takes for an ion to reach the detector, for electric fields of given strengths, is a direct function of its mass and an inverse function of its charge. This form of mass spectrometer is termed a time-of-flight mass spectrometer.

Recently time-of-flight (TOF) mass spectrometers have become widely accepted, particularly for the analysis of relatively nonvolatile biomolecules, and other applications requiring high speed, high sensitivity, and/or wide mass range. New ionization techniques such as matrix-assisted laser desorption/ionization (MALDI) and electrospray (ESI) have greatly extended the mass range of molecules which can be made to produce intact molecular ions in the gas phase, and TOF has unique advantages for these applications. The recent development of delayed extraction, for example, as described in U.S. Pat. Nos. 5,625,184 and 5,627,360, has made high resolution and precise mass measurement routinely available with MALDI-TOF, and orthogonal injection with pulsed extraction has provided similar performance enhancements for ESI-TOF.

These techniques provide excellent data on the molecular weight of samples, but little information on molecular structure. Traditionally tandem mass spectrometers (MS—MS) have been employed to provide structural information. In MS—MS instruments, a first mass analyzer is used to select a primary ion of interest, for example, a molecular ion of a particular sample, and that ion is caused to fragment by increasing its internal energy, for example, by causing the ion to collide with a neutral molecule. The spectrum of fragment ions is then analyzed by a second mass analyzer, and often the structure of the primary ion can be determined by interpreting the fragmentation pattern. In MALDI-TOF, the technique known as post-source decay (PSD) can be employed, but the fragmentation spectra are often weak and difficult to interpret. Adding a collision cell where the ions may undergo high energy collisions with neutral molecules enhances the production of low mass fragment ions and produces some additional fragmentation, but the spectra are difficult to interpret. In orthogonal ESI-TOF, fragmentation may be produced by causing energetic collisions to occur in the interface between the atmospheric pressure electrospray and the evacuated mass spectrometer, but currently there is no means for selecting a particular primary ion.

The most common form of tandem mass spectrometry is the triple quadrupole in which the primary ion is selected by the first quadrupole, and the fragment ion spectrum is analyzed by scanning the third quadrupole. The second quadrupole is typically maintained at a sufficiently high pressure and voltage that multiple low energy collisions occur. The resulting spectra are generally rather easy to interpret and techniques have been developed, for example, for determining the amino acid sequence of a peptide from such spectra. Recently hybrid instruments have been described in which the third quadrupole is replaced by a time-of-flight analyzer.

Several approaches to using time-of-flight techniques both for selection of a primary ion and for analysis and detection of fragment ions have been described previously. For example, a tandem instrument incorporating two linear time-of-flight mass analyzers using surface-induced dissociation (SID) has been used to produce the product ions. In a later version, an ion mirror was added to the second mass analyzer.

U.S. Pat. No. 5,206,508 discloses a tandem mass spectrometer system, using either linear or reflecting analyzers, which is capable of obtaining tandem mass spectra for each parent ion without requiring the separation of parent ions of differing mass from each other. U.S. Pat. No. 5,202,563 discloses a tandem time-of-flight mass spectrometer comprising a grounded vacuum housing, two reflecting-type mass analyzers coupled via a fragmentation chamber, and flight channels electrically floated with respect to the grounded vacuum housing. The application of these devices has generally been confined to relatively small molecules; none appears to provide the sensitivity and resolution required for biological applications, such as sequencing of peptides or oligonucleotides.

For peptide sequencing and structure determination by tandem mass spectrometry, both mass analyzers must have at least unit mass resolution and good ion transmission over the mass range of interest. Above molecular weight 1000, this requirement is best met by MS—MS systems consisting of two double-focusing magnetic deflection mass spectrometers having high mass range. While these instruments provide the highest mass range and mass accuracy, they are limited in sensitivity, compared to time-of-flight, and are not readily adaptable for use with modern ionization techniques such as MALDI and electrospray. These instruments are also very complex and expensive.

SUMMARY OF THE INVENTION

The invention relates to tandem time-of-flight mass spectrometry including: (1) an ion generator; (2) a timed ion selector in communication with the ion generator (3) an ion fragmentation chamber in communication with the ion selector; and (4) an analyzer in communication with the fragmentation chamber. In one embodiment, the ion generator comprises a pulsed ion source in which the ions are accelerated so that their velocities depend on their mass-to-charge ratio. The pulsed ion source may comprise a laser desorption ionization or a pulsed electrospray source. In another embodiment, the ion generator comprises a continuous ionization source such as a continuous electrospray, electron impact, inductively coupled plasma, or a chemical ionization source. In this embodiment, the ions are injected into a pulsed ion source in a direction substantially orthogonal to the direction of ion travel in the drift space. The ions are converted into a pulsed beam of ions and are accelerated toward the drift space by periodically applying a voltage pulse.

In one embodiment, the timed ion selector comprises a field-free drift space coupled to the pulsed ion generator at one end and coupled to a pulsed ion deflector at another end. The drift space may include a beam guide confining the ion beam near the center of the drift space to increase the ion transmission. The pulsed ion deflector allows only those ions within a selected mass-to-charge ratio range to be transmitted through the ion fragmentation chamber. In one embodiment, the analyzer is a time-of-flight mass spectrometer and the fragmentation chamber is a collision cell designed to cause fragmentation of ions and to delay extraction. In another embodiment, the analyzer includes an ion mirror.

A feature of the present invention is the use of the fragmentation chamber not only to produce fragment ions, but also to serve as a delayed extraction ion source for the analysis of the fragment ions by time-of-flight mass spectrometry. This allows high resolution time-of-flight mass spectra of fragment ions to be recorded over their entire mass range in a single acquisition. Another feature of the present invention is the addition of a grid which produces a field free region between the collision cell and the acceleration region. The field free region allows the ions excited by collisions in the collision cell time to complete fragmentation.

The invention also relates to the measurement of fragment mass spectra with high resolution, accuracy and sensitivity. In one embodiment, the method includes the steps of: (1) producing a pulsed source of ions; (2) selecting ions of a specific range of mass-to-charge ratios; (3) fragmenting the ions; and (4) analyzing the fragment ions using delayed extraction time-of-flight mass spectrometry. In one embodiment, the step of producing a pulsed source of ions is performed by MALDI. In one embodiment, the step of fragmenting the ion is performed by colliding the ion with molecules of a gas. In one embodiment, the step of fragmenting the ion includes the steps of exciting the ions and then passing the excited ions through a nearly field-free region to allow the excited ions enough time to substantially complete fragmentation.

A method for high performance tandem mass spectroscopy according to the present invention includes selection of the primary ions. The parameters controlling the pulsed ion generator are adjusted so that the primary ions of interest are focused to a minimum peak width at the pulsed ion deflector. The deflector is pulsed to allow the selected ion to be transmitted, while all other ions are deflected and are not transmitted. The selected ions may be decelerated by a predetermined amount. The selected ions enter the collision cell where they are excited by collisions with neutral molecules and dissociate. The fragment ions, and any residual selected ions, exit the collision cell into a nearly field-free region between the cell and a grid plate maintained at approximately the same potential as the cell. The ion packet at this point is very similar to that produced initially by MALDI in that all of the ions have nearly the same average velocity with some dispersion in velocity and position.

An acceleration pulse of a predetermined amplitude is applied to the grid plate, after a short delay from the time the ions pass through an aperture in the grid plate, the spectrum of the product ions may be recorded and the precise masses determined. Theory predicts that resolution approaching 3000 for primary ion selection should be achievable with minimal loss in transmission efficiency The theoretical resolution for the fragment ions is at least ten times the mass of the fragment, up to mass 2000.

It is therefore an objective of this invention to provide a high performance MS—MS instrument and method employing time-of-flight techniques for both primary ion selection and fragment ion determination. The invention is applicable to any pulsed or continuous ionization source such as MALDI and electrospray The invention is particularly useful for providing sequence and structural information on biological samples such as peptides, oligonucleotides, and oligosaccharides.

BRIEF DESCRIPTION OF THE DRAWINGS

This invention is pointed out with particularity in the appended claims. The above and further advantages of this invention may be better understood referring to the following description taken in conjunctions with the accompanying drawings, in which:

DETAILED DESCRIPTION OF THE INVENTION

Figure 1:
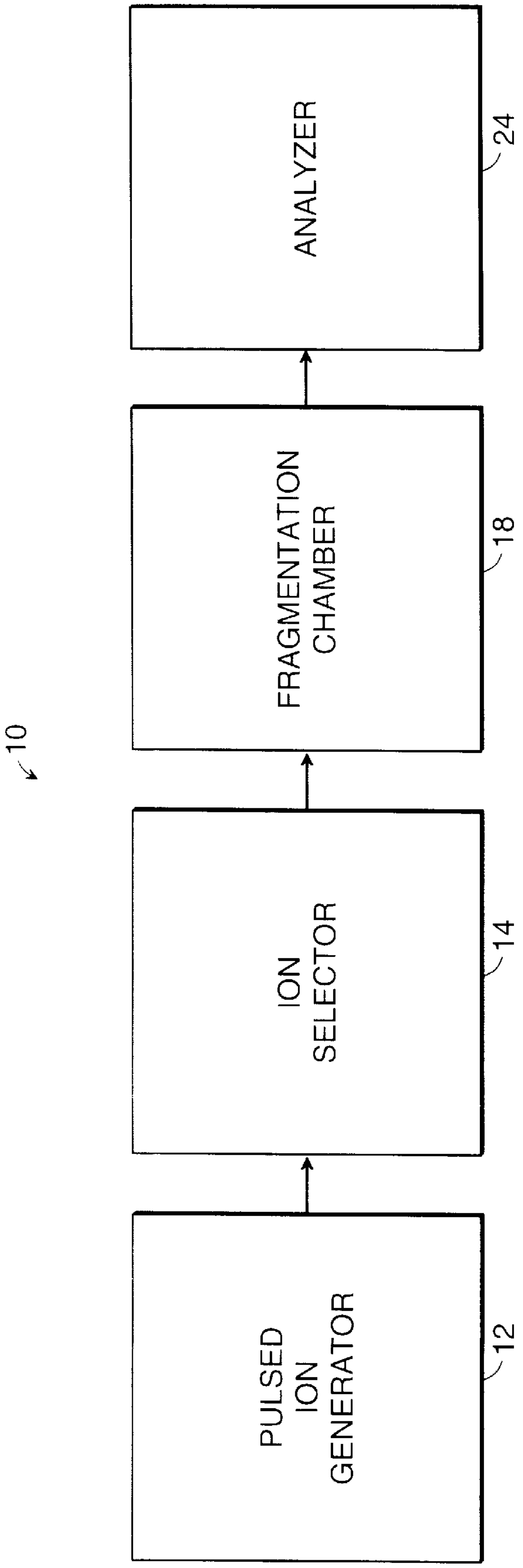
FIG. 1 is a block diagram of an embodiment of the invention.

Referring to FIG. 1, in brief overview, a tandem time-of-flight mass spectrometer 10 that uses delayed extraction according to the present invention includes: (1) a pulsed ion generator 12, (2) a timed ion selector 14 in communication with the pulsed ion generator 12, (3) an ion fragmentor or fragmentation chamber 18, which is in communication with the timed ion selector 14, and (4) an ion analyzer 24. In operation, a sample to be analyzed is ionized by the pulsed ion generator 12. The ions to be studied are selected by the timed ion selector 14, and allowed to pass to the fragmentation chamber 18. Here the selected ions are fragmented and allowed to pass to the analyzer 24. The fragmentation chamber 18 is designed to function as a delayed extraction source for the analyzer 24.

Figure 2A:
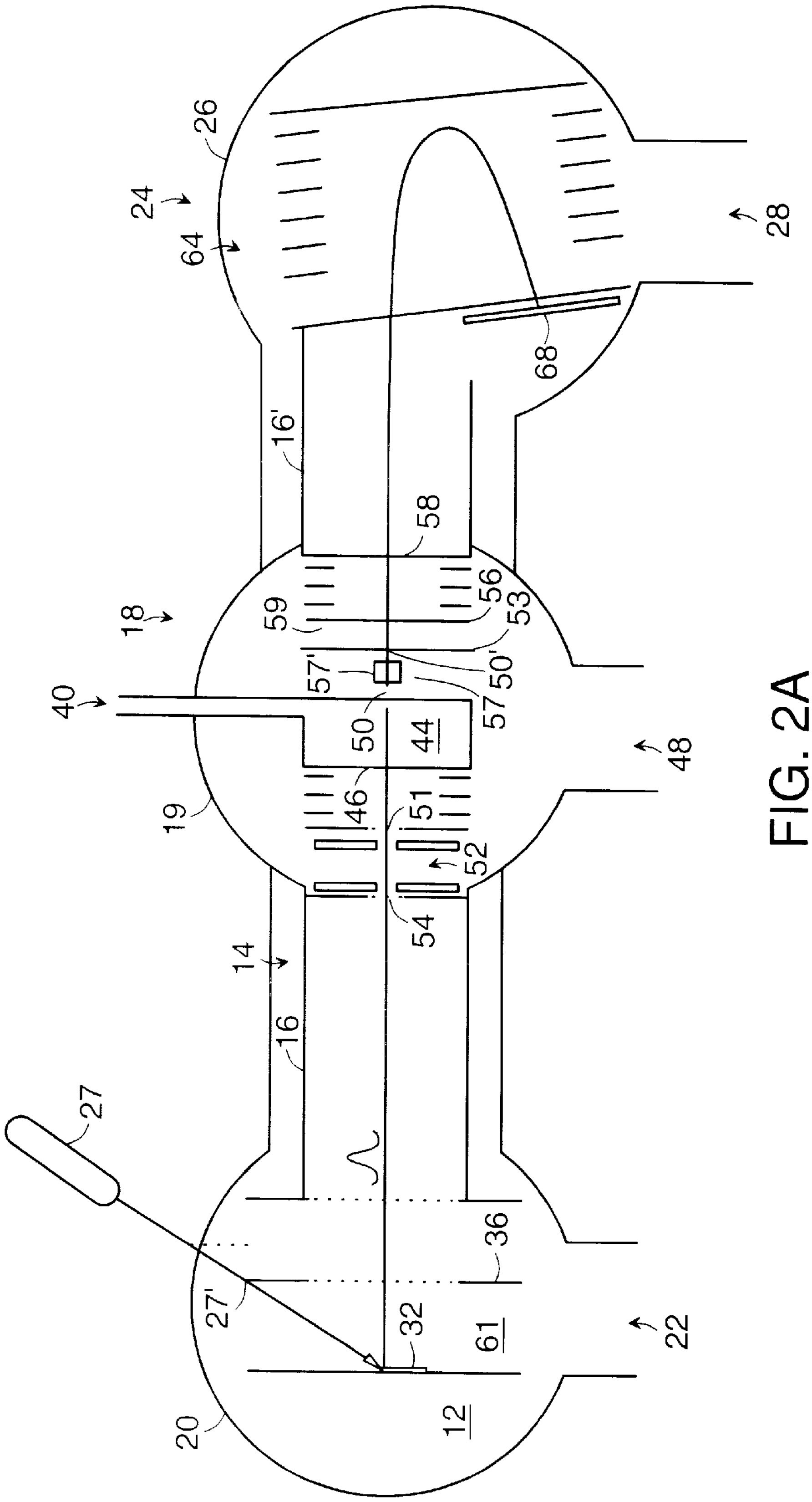
FIG. 2A is a schematic diagram of an embodiment of the invention of FIG. 1.

In more detail and referring to FIG. 2A, an embodiment of a tandem time-of-flight mass spectrometer 10 using delayed extraction includes a pulsed ion generator 12. The pulsed ion generator includes a laser 27 and a source extraction grid 36. A timed ion selector 14 is in communication with the ion generator 12. The ion selector 14 comprises a field-free drift tube 16 and a pulsed ion deflector 52. The field-free drift tube 16 may include an ion guide as described in connection with FIG. 7.

An ion fragmentation chamber 18, is in communication with ion selector 14. The ion fragmentation chamber shown in FIG. 2A includes a collision cell 44. However, the fragmentation chamber 18 may be any other type of fragmentation chamber known in the art such as a photodissociation chamber or a surface induced dissociation chamber. A small aperture 54 at the entrance to the pulsed ion deflector 52 allows free passage of the ion beam to the fragmentation chamber 18, but limits the flow of neutral gas. The fragmentation chamber 18 is in communication with an ion analyzer 24. A small aperture 58 at the exit of the fragmentation chamber 18 allows free passage of the ion beam, but limits the flow of neutral gas.

In one embodiment, a grid plate 53 is positioned adjacent to the collision cell 44 and biased to form a field free region 57. The field free region 57 may include an ion guide 57' which is shown as a box in FIG. 2*a* and which is more fully described in connection with FIG. 7. A fragmentor extraction grid 56 is positioned adjacent to the grid plate 53 and to an entrance 58 to the analyzer 24. In another embodiment, fragmentor extraction grid 56 is positioned directly adjacent to the exit aperture, eliminating the grid plate 53. This embodiment is used for measurements where the fragmentation is substantially completed in the collision cell 44. The analyzer 24 includes a second field-free drift tube 16' in communication with an ion mirror 64. The second field-free drift tube 16' may include an ion guide as described in connection with FIG. 7. A detector 68 is positioned to receive the reflected ions.

The pulsed ion generator 12 and drift tube 16 are enclosed in a vacuum housing 20, which is connected to a vacuum pump (not shown) through a gas outlet 22. Also, the fragmentation chamber 18 and pulsed ion deflector 52 are enclosed in vacuum housing 19, which is connected to a vacuum pump (not shown) through a gas outlet 48. Similarly, the analyzer 24 is enclosed in a vacuum housing 26, which is connected to a vacuum pump (not shown) through a gas outlet 28. The vacuum pump maintains the background pressure of neutral gas in the vacuum housing 20, 19, and 26 sufficiently low that collisions of ions with neutral molecules are unlikely to occur.

In operation, a sample 32 to be analyzed is ionized by the pulsed ion generator 12, which produces a pulse of ions. In one embodiment, the pulsed ion generator 12 employs Matrix Assisted Laser Desorption/Ionization (MALDI). In this embodiment, a laser beam 27' impinges upon a sample plate having the sample 32 which has been mixed with a matrix capable of selectively absorbing the wavelength of the incident laser beam 28.

At a predetermined time after ionization, the ions are accelerated by applying an ejection potential between the sample 32 and the source extraction grid 36 and between the source extraction grid 36 and the drift tube 16. In one embodiment, the drift tube is at ground potential. After this acceleration, the ions travel through the drift tube with velocities which are nearly proportional to the square root of their charge-to-mass ratio; that is, heavier ions travel more slowly. Thus within the drift tube 16, the ions separate according to their mass-to-charge ratio with ions of higher mass traveling more slowly than those of lower mass.

The pulsed ion deflector 52 opens for a time window at a predetermined time after ionization. This permits only those ions with the selected mass-to-charge ratios, arriving at the pulsed ion deflector 52 within the predetermined time window during which the pulsed ion deflector 52 is permitting access to the collision cell 44, to be transmitted. Hence, only predetermined ions, those having the selected mass-to-charge ratio, will be permitted to enter the collision cell 44 by the pulsed ion deflector 52. Other ions of higher or lower mass are rejected.

The selected ions entering the collision cell 44 collide with the neutral gas entering through inlet 40. The collisions cause the ions to fragment. The energy of the collisions is proportional to a difference in potential between that applied to the sample 32 and the collision cell 44. In one embodiment, the pressure of the neutral gas in the collision cell 44 is maintained at about $10^{-3}$ torr and the pressure in the space surrounding the collision cell 44 is about $10^{-5}$ torr. Gas diffusing from the collision cell 44 through an ion entrance aperture 46 and ion exit aperture 50 is facilitated by a vacuum pump (not shown) connected to a gas outlet 48. In another embodiment, a high-speed pulsed valve (not shown) is positioned in gas inlet 40 so as to produce a high pressure pulse of neutral gas during the time when ions arrive at the fragmentation chamber 18 and, for the remainder of the time, the fragmentation chamber 18 is maintained as a vacuum. The neutral gas may be any neutral gas such as helium, air, nitrogen, argon, krypton, or xenon.

In one embodiment, the grid plate 53 and the fragmentor extraction grid 56 are biased at substantially the same potential as the collision cell 44 until the fragment ions pass through an aperture 50' in grid plate 53 and enter the nearly field-free region 59 between the grid plate 53 and the extraction grid 56. At a predetermined time after the ions pass grid plate 53, the potential on grid plate 53 is rapidly switched to a high voltage thereby causing the ions to be accelerated. The accelerated ions pass through the entrance 58 to the analyzer 24, into a second field-free drift tube 16', into the ion mirror 64, and to the detector 68, which is positioned to receive the reflected ions.

The time of flight of the ion fragments, starting from the time that the potential on the grid plate 53 is switched and ending with ion detection by the detector 68, is measured. The mass-to-charge ratio of the ion fragments is determined from the measured time. The mass-to-charge ratio can be determined with very high resolution by properly choosing the operating parameters so that the fragmentation chamber 18 functions as a delayed extraction source of ion fragments. The operating parameters include: (1) the delay between the passing of the fragment ions through the aperture 50' in grid plate 53 and the application of the accelerating potential to the grid plate 53; and (2) the magnitude of the extraction field between the grid plate 53 and the fragmentor extraction grid 56.

In another embodiment, grid 53 is not used or does not exist. This embodiment is used for measurements where the fragmentation is substantially completed in the collision cell 44. In this embodiment, the fragmentor extraction grid 56 is biased at substantially the same potential as the collision cell 44. At a predetermined time after the ions exit the collision cell 44, the high voltage connection to the collision cell 44 is rapidly switched to a second high voltage supply (not shown) thereby causing the ions to be accelerated. The accelerated ions pass through the entrance 58 to the analyzer 24, into a second field-free drift tube 16', into the ion mirror 64, and to the detector 68, which is positioned to receive the reflected ions.

The time of flight of the ion fragments, starting from the time that the potential on the collision cell 44 is switched and ending with ion detection by the detector 68, is measured. The mass-to-charge ratio of the ion fragments is determined from the measured time. The mass-to-charge ratio can be determined with very high resolution by properly choosing the operating parameters so that the fragmentation chamber 18 functions as a delayed extraction source of ion fragments. The operating parameters include: (1) the predetermined time after the ions exit the collision cell 44 before the high voltage is rapidly switched to the second high voltage; and (2) the magnitude of the extraction field between the collision cell 44 and the fragmentor extraction grid 56.

Figure 2B:
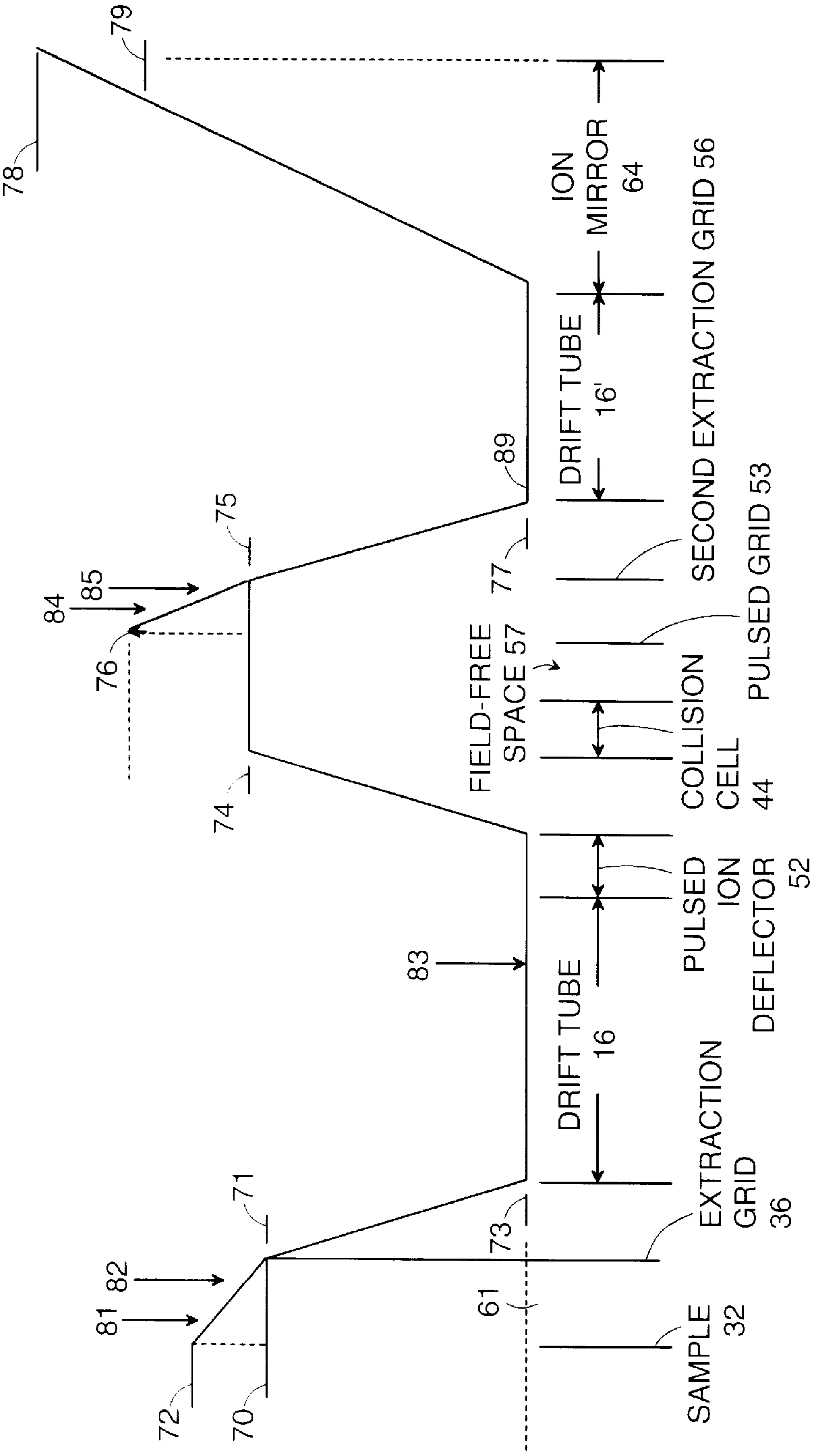
FIG. 2B is a graphical representation of the voltages present at each point of the embodiment of the invention shown in FIG. 2A.

FIG. 2B depicts the electric potential experienced by an ion in each portion of the embodiment of the tandem mass spectrometer illustrated in FIG. 2A. A voltage 70 is applied to the sample 32 and a voltage 71 is applied to extraction grid 36. Voltage 71 is approximately equal to voltage 72. In response to the laser beam 28 impinging on the sample 32, a pulse of ions is formed and emitted into a substantially field-free space 61 between sample 32 and the extraction grid 36. The ions depart from the sample 32 with a characteristic velocity distribution which is nearly independent of their mass-to-charge ratio. As the ions drift in the nearly field-free space 61 between the sample 32 and the extraction grid 36, the ions are distributed in space with the faster ions nearer to the extraction grid 36 and the slower ions nearer to the sample 32. At a predetermined time after ionization, the voltage applied to the sample 32 is rapidly switched to higher voltage 72, thereby establishing an electric field between the sample 32 and the extraction grid 36. The electric field between the sample 32 and the extraction grid 36 causes the initially slower ion, which are closest to the sample 32, to receive a larger acceleration than the initially faster ion.

The drift tube 16 is at a lower potential 73 than the extraction grid 36 and, therefore, a second electric field is established between the extraction grid and the drift tube. In one embodiment the voltage 73 is at ground potential. Thus, the ions are further accelerated by the second electric field. By appropriate choices of the voltages 71 and 72 and the delay time between formation of the ion pulse and switching on the extraction voltage 72, the initially slower ions at 81 are accelerated more than the initially faster ions at 82 and, therefore, the initially slower ions eventually overtake the initially faster ions at a selected focal point 83. The selected focal point 83 may be chosen to be at the pulsed ion deflector 52, at the collision cell 44, or any other point along the ion trajectory.

For the velocity distributions typical for production of ions by MALDI, the total time spread at the selected focal point 83 for ions of a specified mass-to-charge ratio is typically about one nanosecond or less. If the selected focal point 83 is chosen to coincide with the location of the pulsed ion deflector 52, then the pulsed ion deflector 52 gate is opened for a short time interval corresponding to the time of arrival of ions of a selected mass-to-charge ratio and is closed at all other times to reject all other ions. The delayed extraction of the present invention is advantageous because the resolution of ion selection is limited only by properties of the pulsed ion deflector 52 since the time width of the ion packet can be made very small. Thus, high resolution ion selection is possible. In contrast, with continuous extraction, all of the ions receive the same acceleration from the electric fields and no velocity focusing occurs. Thus the time width of a packet of ions of a particular mass-to-charge ratio increases in proportion to the ion travel time from the sample to any point along the trajectory and the resolution of ion selection cannot be very high.

In operation, the pulsed ion deflector 52 establishes a transverse electric field that deflect low mass ions until the arrival of ions of a selected mass-to-charge ratio. At which time, the transverse fields are rapidly reduced to zero thereby allowing the selected ions to pass through. After passage of the selected ions, the transverse fields are restored and any higher mass ions are deflected. The selected ions are transmitted undeflected into the fragmentation chamber 18.

A voltage 74 may be applied to the collision cell 44 to reduce the kinetic energy of the ions before they enter the collision cell 44 through the entrance aperture 46. The energy of the ions in the collision cell 44 is determined by their initial potential 81 or 82 relative to voltage 74 plus the kinetic energy associated with their initial velocity. The energy with which ions collide with neutral molecules within the collision cell 44 can be varied by varying the voltage 74.

When an ion collides with a neutral molecule within the collision cell 44, a portion of its kinetic energy may be converted into an internal energy that is sufficient to cause the ion to fragment. Energized ions and fragments continue to travel through the collision cell 44, with a somewhat diminished velocity, due to collisions in the cell 44 and eventually emerge through the exit aperture 50 within a still narrow time interval and with a velocity distribution corresponding to the initial velocity distribution, as modified by delayed extraction and by collisions.

In one embodiment, the voltage 74 applied to the grid plate 53 and the voltage 75 applied to the fragmentor extraction grid 56 are equal and, therefore, produce a field-free region between the collision cell 44 and the fragmentor extraction grid 56. As the ions drift in the field-free region they are distributed in space with the faster ions nearer to the fragmentor extraction grid 56 and the slower ions nearer to the grid plate 53.

After a predetermined time delay, the voltage applied to the grid plate 53 is rapidly switched to a higher voltage 76 thereby establishing an electric field between the grid plate 53 and the fragmentor extraction grid 56. As a result, the initially slower ion receives a larger acceleration than the initially faster ion. In one embodiment, the grid plate 53 and the collision cell 44 are electrically connected so that both are switched simultaneously. In another embodiment, the voltage applied to the collision cell 44 is constant, and only the voltage applied to grid plate 53 is switched.

In another embodiment, the grid plate 53 is not used or does not exist. This embodiment is used for measurements where the fragmentation is substantially completed in the collision cell 44. In this embodiment, there is no field-free region between the collision cell 44 and the fragmentor extraction grid 56. After a predetermined time delay, the voltage applied to the collision cell 44 is rapidly switched to the higher voltage 76 thereby establishing an electric field between the collision cell 44 and the fragmentor extraction grid 56. As a result, the initially slower ion receives a larger acceleration than the initially faster ion.

The ions are further accelerated in an electric field between the fragmentor extraction grid 56 and the drift tube 16'. In one embodiment, the voltage 77 may be at ground potential. By appropriately choosing the voltages 76 and 74 and the collision cell 44 switching time, the initially slower ions at 84 are sufficiently accelerated so that they at 85 overtake the initially faster ions at a selected focal point 89.

In one embodiment, this focal point is chosen at or near the entrance 58 to the analyzer 24. In this embodiment, the ions travel through a second field-free region 16' and enter the ion mirror 64 in which the ions are reflected at voltage 79 and eventually strike the detector 68. For a given length of the drift tube 16' and length of the mirror 64, the voltage 78 can be adjusted to refocus the ions, in time, at the detector 68. In this manner, the fragmentation chamber 18 performs as a delayed extraction source for the analyzer 24 and high resolution spectra of fragment ions can be measured.

Figure 3:
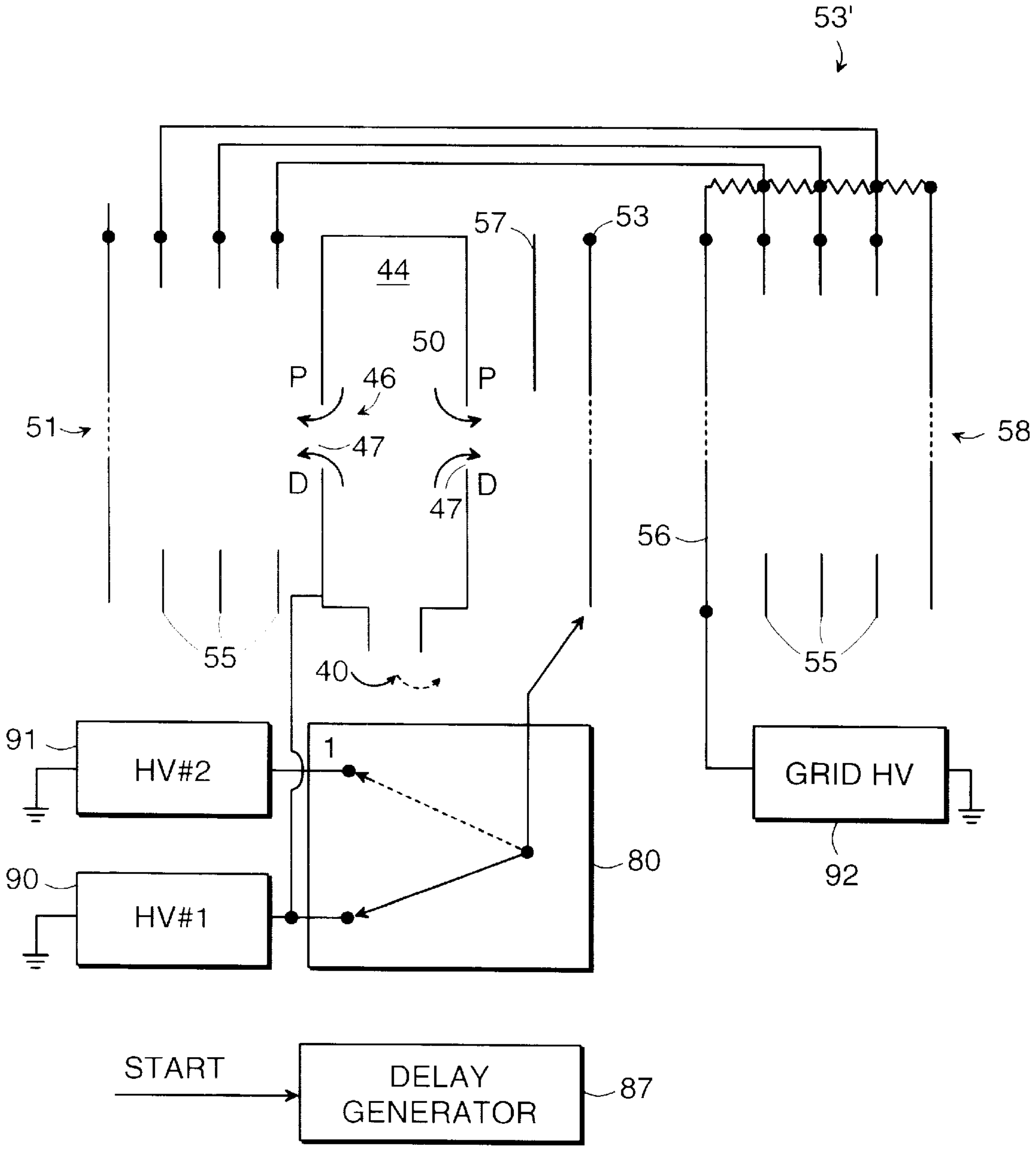
FIG. 3 is a schematic diagram of an embodiment of the fragmentation chamber of FIG. 2.

FIG. 3 is a schematic diagram of an embodiment of the fragmentation chamber 18 of FIG. 2. The collision cell 44 includes the gas inlet 40 through which gas is introduced into the collision cell 44 and entrance and exit apertures 46 and 50, respectively, through which the gas diffuses (arrows D) out from the collision cell 44. These apertures 46, 50 may be covered with highly transparent grids 47 to prevent penetration of external electric fields into the collision cell 44. The gas which diffuses out is drawn off by the vacuum pump attached to the gas outlet 48 (FIG. 2) of the fragmentation chamber 18. In one embodiment, uniform electric fields are established between the collision cell 44 and entrance aperture 51 to fragmentation chamber 18, and between fragmentor extraction grid 56 and entrance aperture 58 to the analyzer 24.

A high voltage supply 92 is connected to extraction grid 56 and resistive voltage divider 53'. The voltage divider 53' is attached to electrically isolated guard rings 55, which are spaced uniformly in the space between extraction grid 56 and entrance aperture 58 to analyzer 24, and between the collision cell 44 and the entrance aperture 51 to fragmentation chamber 18. The voltage divider 53' is adjusted to provide approximately uniform electric fields in these spaces. A high voltage supply 90 is electrically connected to the collision cell 44 and is set to voltage 74 (FIG. 2B). The voltage on the grid plate 53 is set by a switch 80 which is in electrical communication with high voltage supplies 90 and 91 that are set to voltages 74 and 76, respectively (FIG. 2B).

The switch 80 is controlled by a signal from delay generator 87. The delay generator 87 provides a control signal to the switch 80 in response to a start signal received from a controller (not shown), which in one embodiment is a digital computer. The delay is set so that ions of a selected mass-to-charge ratio pass through the aperture 50' in the grid plate 53 shortly before the switch 80 is activated to switch the high voltage connection to the grid plate 53 from the voltage 74 produced by high voltage supply 90 to the voltage 76 produced by high voltage supply 91

Figure 4:
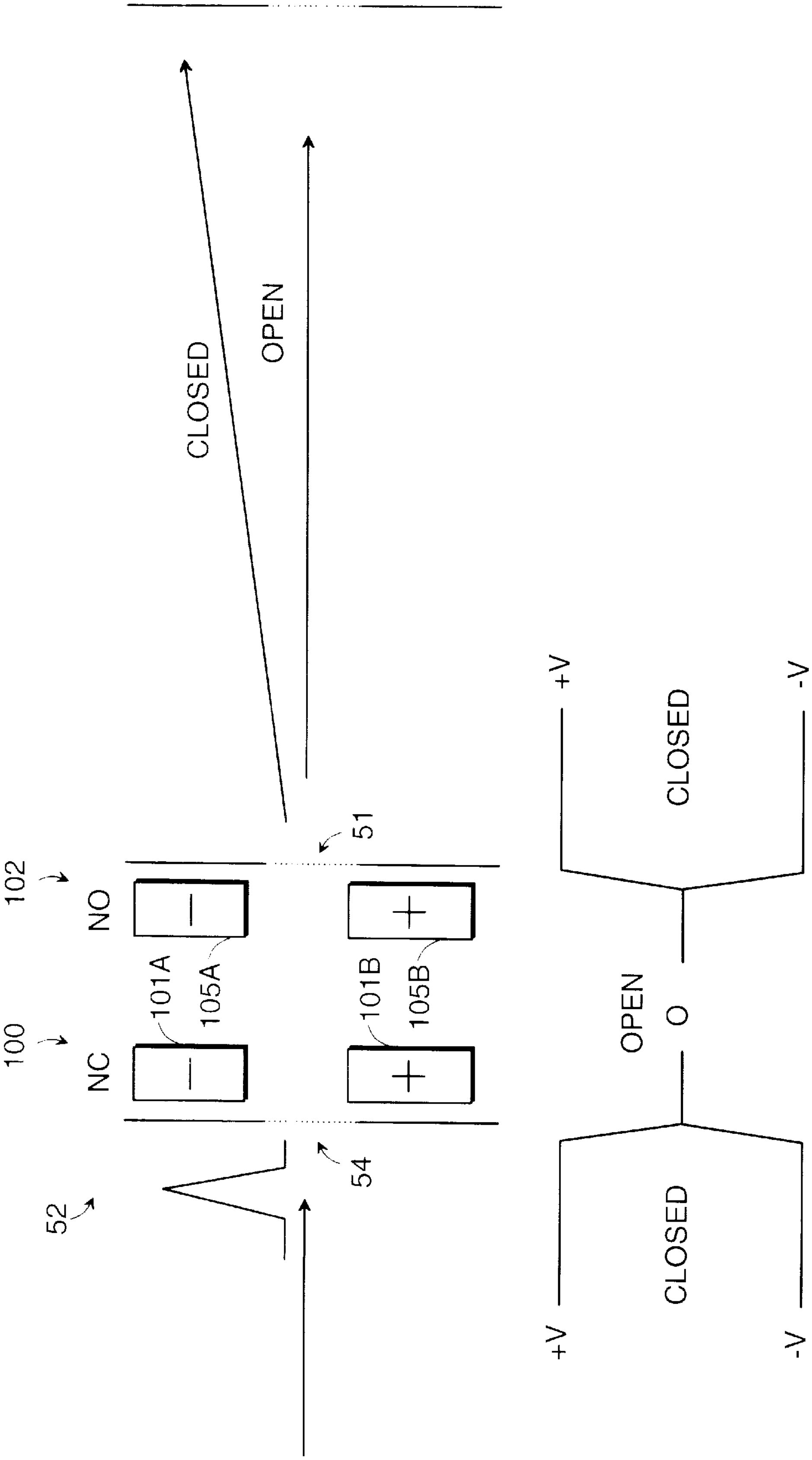
FIG. 4 is a schematic diagram of an embodiment of the pulsed ion deflector and associated gating potential of FIG. 2.

Referring also to FIG. 4, in one embodiment, the pulsed ion deflector 52 includes two deflectors in series 100, 102 located between apertures 51 and 54 covered by highly transparent grids. Aperture 54 also serves as exit aperture from drift tube 16 and aperture 51 also serves as the entrance aperture 51 to the fragmentation chamber 18. The gridded apertures 51 and 54 prevent the fields generated by the deflectors 100, 102 from propagating beyond the pulsed ion deflector 52. The deflectors 100, 102 are located as close to the plane of the grids over the apertures 51, 54 as possible without initiating electrical breakdown.

In one embodiment, the deflector 100 closest to the sample 32 is operated in a normally closed (NC) or energized configuration in which the electrodes 101A, 101B of the deflector 100 have a potential difference between the electrodes. The second deflector 102 is operated in a normally open (NO) or non-energized configuration in which the electrodes 105A, 105B have no voltage difference between them. By correctly choosing the delay between the production of ions and time of arrival of ions of the desired mass-to-charge ratio at the deflector 100, the entrance electrodes 101A, 101B may be de-energized to open just as the desired ions reach the deflector 100, while the electrodes 105A, 105B of the second deflector 102 are de-energized to close just after the ions of interest pass deflector 102. In this way, ions of lower mass are rejected by the first deflector 100 and ions of higher mass are rejected by the second deflector 102. Ions are rejected by deflecting them through a sufficiently large angle to cause them to miss a critical aperture. In various embodiments (FIG. 2, for example), the critical aperture may coincide with the entrance aperture 46 to the collision cell 44, to the entrance aperture 58 to the analyzer 24, or to the detector 68, whichever subtends the smallest angle of deflection.

The equations of motion for ions in electric fields allows time-of-flight for any ion between any two points along an ion trajectory to be accurately calculated. For the case of uniform electric fields, as employed in an embodiment depicted in FIGS. 2A and B, these equations are particularly tractable, and provided that the voltages, distances, and initial velocities are accurately known, the flight time for any ion between any two points can be accurately calculated. Specifically, the time for an ion to traverse a uniform accelerating field is given by the equation:

$$t=(v_2-v_1)/a$$

where $v_2$ is the final velocity after acceleration, $v_1$ is the initial velocity before acceleration and t is the time that the ion spends in the field. The acceleration is given by $$a=z(V_1-V_2)/md$$

where z is the change on an ion, m is the mass of the ion, $V_1$ and $V_2$ are the applied voltages, and d is the length of the field. In a field-free space, the acceleration is zero, and $$t=D/v$$

where D is the length of the field-free space and v is the ion velocity.

In conservative systems (i.e. no frictional losses), the sum of kinetic energy and potential energy is constant. For motion of charged particles in an electric field, this can be expressed as $$T_2-T_1=z(V_1-V_2)$$

where the kinetic energy $T=mv^2/2$. This can be solved for v to give an explicit expression for the velocity of a charged particle at any point.

For ions traveling through a series of uniform electrical fields, the above equations provide exactly the time of flight as a function of mass, charge, potentials, distances, and the initial position and velocity of the ion. If the SI system is used, in which distance is expressed in meters, potentials in volts, masses in kg, charge in coulombs, and time in seconds, then no additional constants are required.

In some cases, all of the parameters may not be known a priori to sufficient accuracy, and it may be necessary in these cases to determine empirically, corrections to the calculated flight times.

In any case, the flight time for an ion of any selected mass-to-charge ratio can be determined with sufficient accuracy to allow the required time delays between generation of ions in the pulsed ion generator 12 and selection of ions in the timed ion selector 14 or pulsed extraction of ions from the collision cell 44 to be determined accurately.

Figure 5:
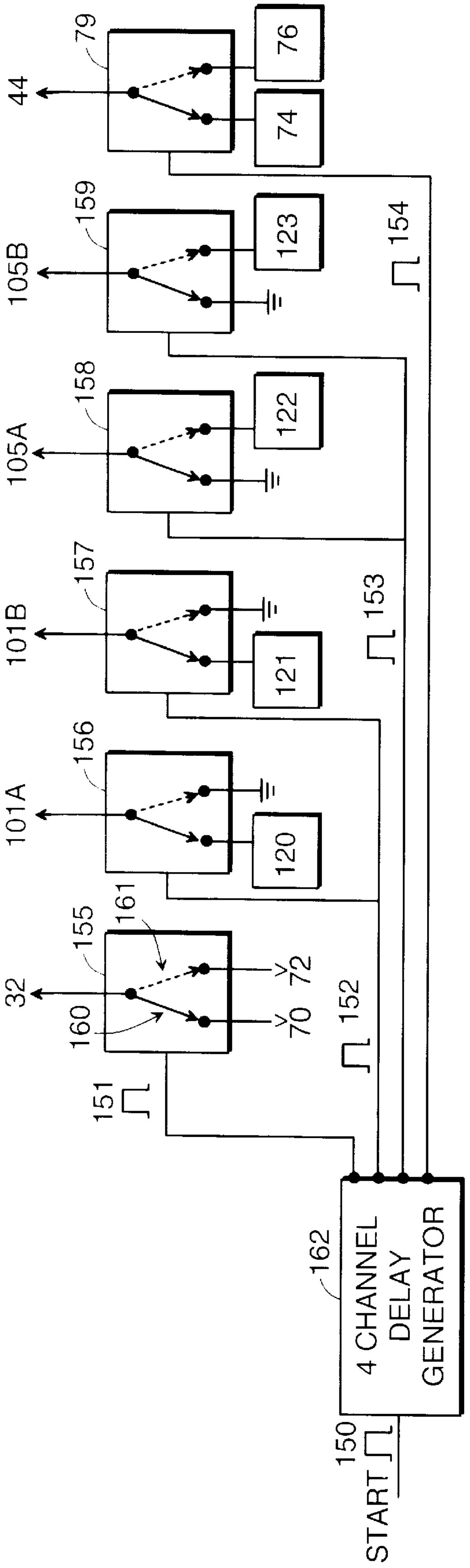
FIG. 5 is a block diagram of an embodiment of the voltage switching circuits employed in the pulsed ion generator, the timed ion selector, and the timed pulsed extraction referenced in FIG. 2.

Referring also to FIG. 5, in one embodiment, a four channel delay generator 162 is started by a start pulse 150 which is synchronized with production of ions in the pulsed ion generator 12. In one embodiment, the start pulse is generated by detecting a pulse of light from the laser beam 28. After a first delay period, a pulse 151 is generated by the delay generator 162, which triggers switch 155 in communication with voltage sources providing voltages 70 and 72, respectively.

Prior to receiving pulse 151, the switch 155 is in position 160 connecting the voltage source for voltage 70 to sample 32. Upon receiving pulse 151, the switch 155 rapidly moves to position 161 which connects the voltage source for voltage 72 to sample 32. The first delay is chosen so that ions of a selected mass-to-charge ratio produced by the pulsed ion generator 12 are focused in time at a selected point, for example, the pulsed ion deflector 52.

After a second delay period, pulse 152 is generated which triggers switches 156 and 157. Prior to receiving pulse 152, switch 156 connects voltage source 120 to deflection plate 101A, and switch 157 connects voltage source 121 to deflection plate 101B. Upon receiving pulse 152, the switches 156 and 157 rapidly move to connect both deflection plates 101A and 101B to ground.

Similarly, switches 158 and 159 initially connect electrodes 105A and 105B to ground, and in response to delayed pulse 153, occurring after a third delay period, connect electrodes 105A and 105B to voltage sources 122 and 123, respectively. In one embodiment, voltage sources 120 and 122 supply voltages which are equal and voltage sources 121 and 123 supply voltage sources which are equal in magnitude to the voltage supplied by voltage source 120 but of opposite sign. The second delay period is chosen to correspond to arrival of an ion of selected mass-to-charge ratio at or near the entrance aperture 54 of the pulsed ion deflector 52, and the third delay period is chosen to correspond to arrival of an ion of selected mass-to-charge ratio at or near the exit aperture 51 of the pulsed ion deflector 52.

After a fourth delay period, pulse 154 is generated which triggers switch 79. Prior to receiving pulse 154, switch 79 connects a voltage source supplying voltage 74 to grid plate 53, and upon receiving pulse 154 switch 79 rapidly switches to connect voltage source supplying voltage 76 to grid plate 53. The fourth delay period is chosen to correspond to arrival of an ion of selected mass-to-charge ratio at or near the aperture 50' of grid plate 53. With proper choice of the fourth delay period, the fragmentation chamber 18 acts as a delayed extraction source for analyzer 24, and both primary and fragment ions are focused, in time, at the detector 68. Each of the switches 79, 155, 156, 157, 158, and 159 must be reset to their initial state prior to the next start pulse. The time and speed of resetting the switches is not critical, and it may be accomplished after a fixed delay built into each switch, or a delay pulse from another external delay channel (not shown) may be employed.

Figure 6:
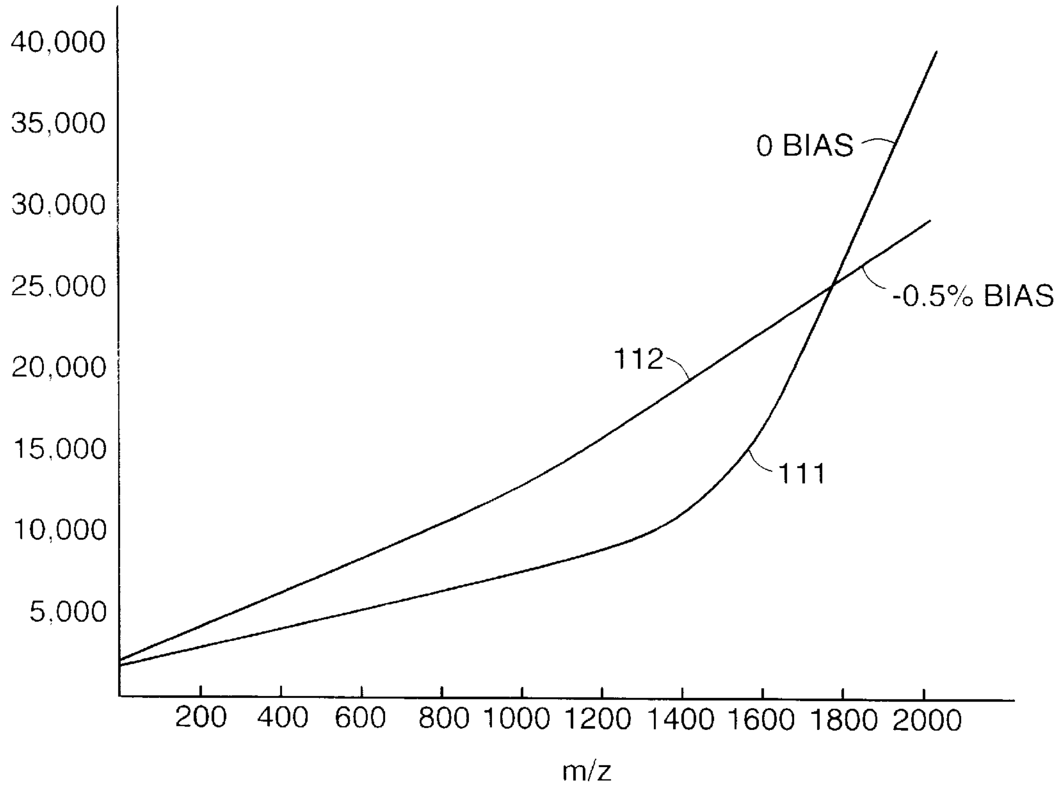
FIG. 6 is a graph of the resolution versus mass-to-charge ratio for fragment ions resulting from fragmentation of a hypothetical ion of mass-to-charge ratio 2000 for the embodiment of the invention of FIG. 2.

Referring also to FIG. 6, the resolution for fragment ions can be calculated for any instrumental geometry, such as the embodiment described in FIG. 2, with specified distances, voltages and delay times. The plots shown in FIG. 6, correspond to calculations of resolution as a function of fragment mass for an ion of mass-to-charge ratio (m/z) of 2000 produced in the pulsed ion generator 12 with a sample voltage 72 of 20 kilovolts and a collision cell voltage 74 of 19.8 kilovolts corresponding to an ion-neutral collision energy of 200 volts in the laboratory reference frame. (FIGS. 2A and B). At a delay of 858 nanoseconds after the primary ion of m/z 2000 was calculated to pass through the aperture 50', the grid plate 53 was switched to the higher voltage 76, which for purposes of this calculation was 25 kilovolts.

In one case (curve 111 in FIG. 6), the voltage 75 applied to the fragmentor extraction grid 56 was also 19.8 kilovolts so that the region between the extraction grid 56 and the collision cell 44 was field-free. In another case (curve 112 in FIG. 6), the voltage 75 applied to the fragmentor extraction grid 56 was 19.9 kilovolts, so that ions emerging from the exit 50 of the collision cell 44 were decelerated by a small amount. As can be seen from FIG. 6, the latter case 112 provides somewhat better resolution at lower fragment mass at the expense of slightly lower theoretical resolution at higher mass.

Figure 7:
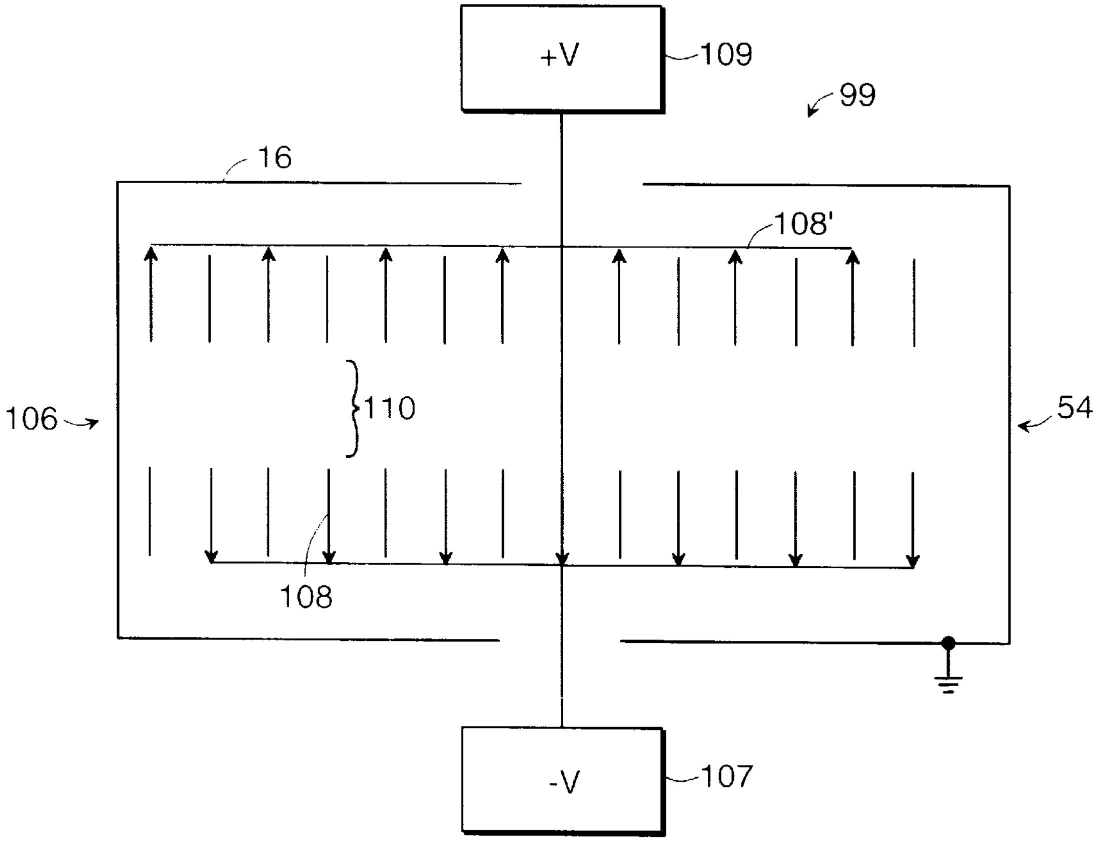
FIG. 7 is a schematic diagram of an embodiment of an ion guide comprising a stacked plate array that can be positioned in various field free regions of an embodiment of the invention of FIG. 1.

Referring also to FIG. 7, some embodiments of this invention include an ion guide 99 positioned in one or more field free regions. An ion guide may be positioned in at least one of the drift tube 16 or 16' or the field free region 57 to increase the transmission of ions. Several types of ion guides are known in the art including the wire-in-cylinder type and RF excited multipole lenses consisting of quadrupoles, hexapoles or octupoles. One embodiment of the ion guide employs a stacked ring electrostatic ion guide. A stacked ring ion guide includes a stack of identical plates or rings 108, 108', each with a central aperture 110, stacked with uniform space between each pair of rings 108. Every other ring 108' is connected to a positive voltage supply 109, and each intervening ring 108 is connected to a negative voltage supply 107.

The end plates of the drift tube 16 in which the entrance 106 and exit 54 apertures are located, are spaced from the ends of stacked ring ion guide, by a distance which is one-half of the distance between the adjacent rings of the guide. To avoid perturbing the ion flight time through the ion guide 99, it is important that the number of positively biased electrodes be equal to the number of negatively biased electrodes. By choosing an appropriate magnitude of the applied voltages from voltage supplies 107 and 109 relative to the energy of the incident ion beam, the ion beam is confined near the axis of the guide. The advantage of the stacked ring ion guide over, for example, the wire-in-cylinder ion guide, is that the ions are efficiently transmitted over a broad range of energy and mass without significantly perturbing the flight time of ions.

Figure 8:
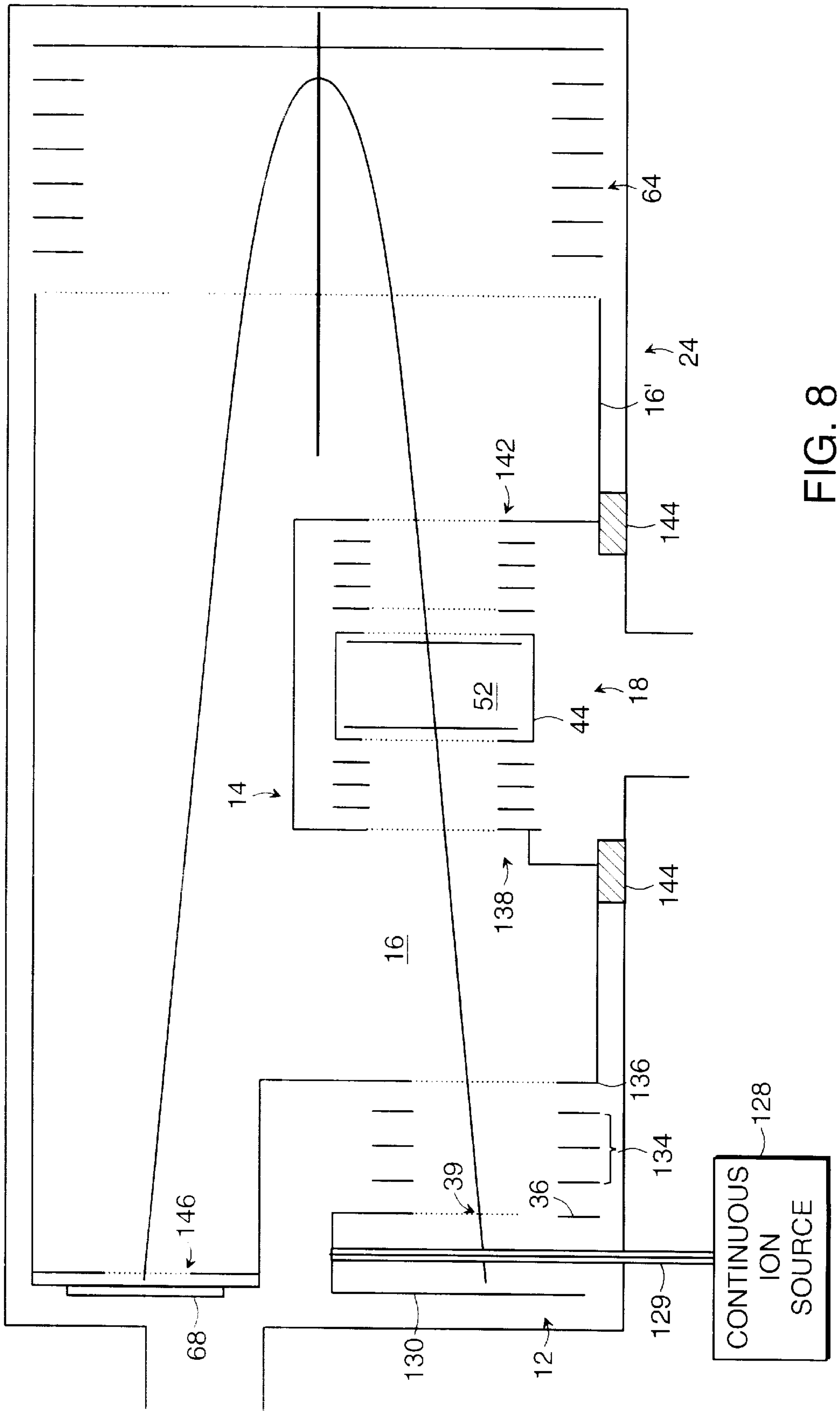
FIG. 8 is a schematic diagram of another embodiment of the invention of FIG. 1.

FIG. 8 is another embodiment of the invention. Referring also to FIG. 8, either a continuous or a pulsed source of ions 128 may be used to supply ions to the pulsed ion generator 12. Any ionization techniques known in the art, including electrospray, chemical ionization, electron impact, inductively coupled plasma (ICP), and MALDI, can be employed with this embodiment. In this embodiment, a beam of ions 129 is injected into a field-free space between electrode 130 and extraction grid 36, and periodically a voltage pulse is applied to electrode 130 to accelerate the ions in a direction orthogonal to that of the initial beam. Ions are further accelerated in a second electric field formed between extraction grid 36 and grid 136.

Guard plates 134 are connected to a voltage divider (not shown) and may be used to assist in producing a uniform electric field between grids 36 and 136. Ions pass through field-free space 16 and enter fragmentation chamber 18. Within the fragmentation chamber 18, ions enter collision cell 44 where they are caused to fragment by collisions with neutral molecules. In this embodiment, as discussed in more detail below, a pulsed ion deflector is located within the collision cell 44 and the fragmentation chamber 18 functions as a delayed extraction source for analyzer 24. Ions exiting from the fragmentation chamber 18 pass through a field-free space 16', are reflected by an ion mirror 64, re-enter the field-free space 16' and are detected by detector 68.

Referring also to FIG. 2B, this potential diagram also applies to an embodiment illustrated in FIG. 8 with a few changes. Electrode 130 (FIG. 8) replaces sample 32 (FIG. 2) and pulsed ion deflector 52 is located within collision cell 44 (FIG. 8). A beam of ions 129 produced in continuous ion source 128 enters the space between electrode 130 and extraction grid 36 between points 81 and 82. Initially the voltage 70 on electrode 130 is equal to voltage 71 on extraction grid 36, and periodically the electrode 130 is switched to voltage 72 to extract ions. The voltage difference between 70 and 72 is chosen so that ions in the beam are focused, in time, at or near the exit from the collision cell 44. In one embodiment, the voltage 71 on extraction grid 36 is ground potential, and voltage 73 on drift tube 16 and 16' is a voltage opposite in sign to that of ions of interest.

The energy of the ions in the collision cell 44 is determined by their initial potential 81 or 82 relative to voltage 74 plus the kinetic energy associated with their initial velocity. Thus the energy with which ions collide with neutral molecules within the collision cell 44 can be varied by varying the voltage 74. In one embodiment, the voltage 71 and the voltage 74 are at ground potential. In this embodiment the extraction field between collision cell 44 and fragmentor extraction grid 56 is formed by switching voltage 75, initially at or near ground, to a lower voltage.

Figure 9:
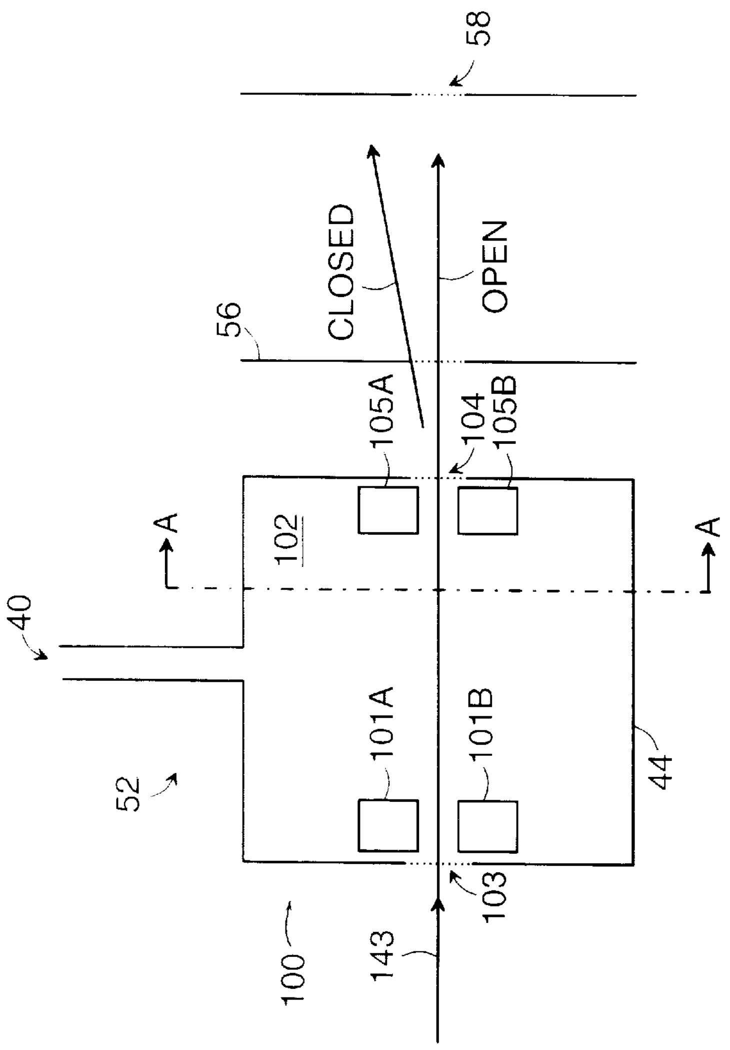
FIG. 9 is a schematic diagram of an embodiment of a collision cell as the fragmentation chamber for the embodiment of the invention shown in FIG. 8.

Referring also to FIG. 9, in one embodiment, a pulsed ion deflector 52 is located within the collision cell 44. Ions from the pulsed ion generator 12 (FIG. 8) are focused at or near the exit 104 of collision cell 44. At the time that a pulse of ions with a selected mass-to-charge ratio arrive at or near the entrance 103 to collision cell 44, pulsed ion deflector 100 is de-energized to allow selected ions to pass undeflected. At the time that the pulse of ions with selected mass-to-charge ratio arrive at or near exit 104 to collision cell 44, pulsed ion deflector 102 is energized to deflect ions of higher mass, which arrive later at pulsed deflector 102. Thus, ions with lower mass-to-charge ratio are deflected by pulsed ion deflector 100 and ions with higher mass-to-charge ratio are deflected by pulsed ion deflector 102, and ions within the selected mass-to-charge ratio range are transmitted undeflected. The voltages applied to the pulsed ion deflectors 100 and 102 are adjusted so that deflected ions and any fragments produced within collision cell are not transmitted through a critical aperture, which in this embodiment, is the entrance aperture 58 to the analyzer 24.

Figure 9A:
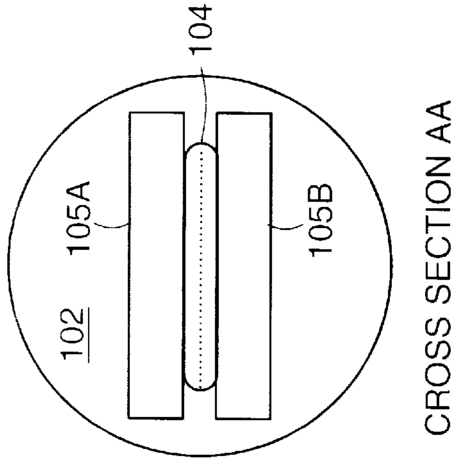
FIG. 9A is a cross section view of the collision cell in FIG. 9.

In the embodiment illustrated in FIG. 8, the beam from the continuous ion source 128 is cylindrical in cross section and well collimated so that velocity components in the direction perpendicular to the axis of the beam are very small. As a consequence, the pulsed beam 39 generated by the pulsed ion generator 12 is relatively wide in the direction of ion travel from the continuous ion source 128, but is narrow in orthogonal directions. That is, if the beam direction is along the x-axis, then the beam widths orthogonal to this will be narrow. The widths of the apertures 36, 136, 138, 103, 104, 56, and 142 must be wide enough in the plane defined by directions of the continuous beam 129 and the pulsed beam 32 to allow essentially the entire pulsed beam to be transmitted, but may be narrow in the direction perpendicular to this plane. This is illustrated in FIG. 9A which shows a cross section through the collision cell 44, wherein the exit aperture 104 is 25 mm long in the direction parallel to the beam from the continuous ion source 128, and is 1.5 mm in the direction orthogonal to the plane defined by the beam from the continuous ion source 128 and the pulsed beam 39. The other apertures 36, 136, 138, 103, 56, 142 may have similar dimensions. Also, the initial velocity of the continuous ion beam 129 adds vectorially to the velocity imparted by acceleration in the pulsed ion generator 12. As a result, the trajectory of the pulsed ion beam 39 is at a small angle relative to the direction of acceleration and the slits are offset along their long direction so that the center of the pulsed ion beam 39 passes near the center of each aperture.

Figure 10:
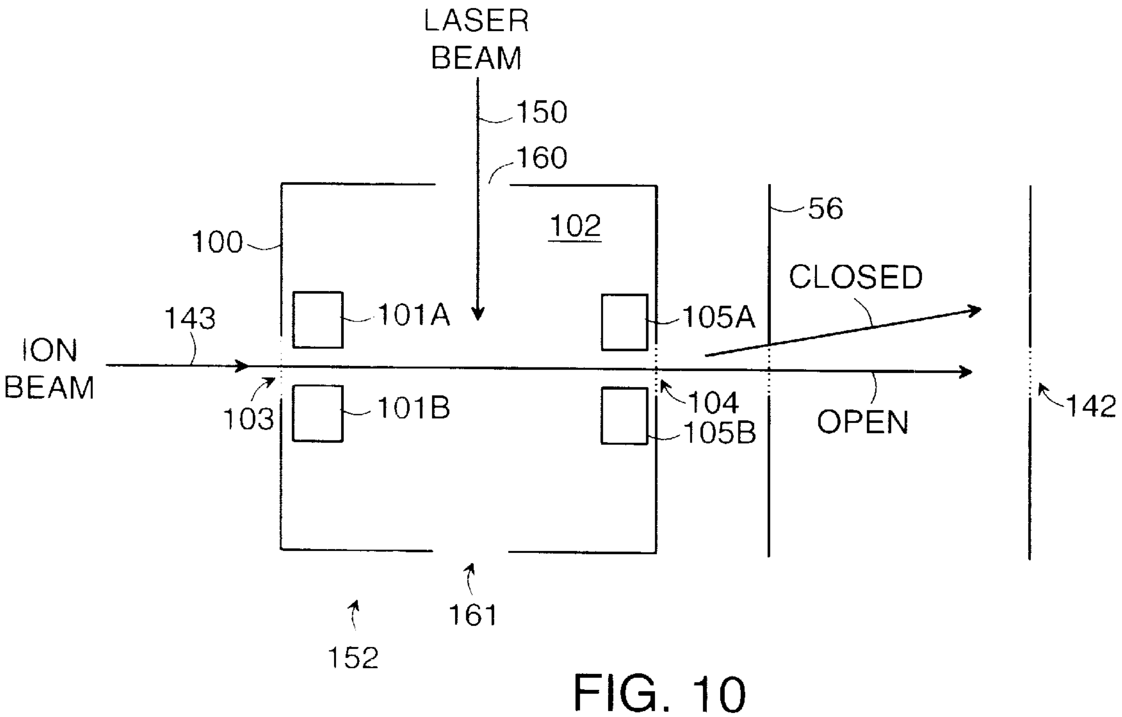
FIG. 10 is a schematic diagram of an embodiment of a photodissociation cell as the fragmentation chamber of the embodiment of the invention shown in FIG. 8.

Referring also to FIG. 10, one embodiment of the invention employs a photodissociation cell 152 in fragmentation chamber 18. In one embodiment, the photodissociation cell is similar to the collision cell 44, but instead of an inflow of neutral gas through inlet 40, a pulsed laser beam 150 is directed into the cell through aperture or window 160 and exits from the cell through aperture or window 161. The laser pulse is synchronized with the start pulse and a delay generator (not shown) so that the laser pulse arrives at the center of the photodissociation cell at the same time as the ion pulse of a selected mass-to-charge ratio.

The wavelength of the laser is chosen so that the ion of interest absorbs energy at this wavelength. In one embodiment, a quadrupled Nd: YAG laser having a wavelength of the laser light of 266 nm is used. In another embodiment, an excimer laser having a wavelength of 193 nm is used. Any wavelength of radiation can be employed provided that it is absorbed by the ion of interest. The ion of interest is energized by absorption of one or more photons from the pulsed laser beam 150 and is caused to fragment. The fragments are analyzed with the fragmentation chamber 18 acting as a delayed extraction source for analyzer 24, as described in detail above. The photodissociation cell 152 is also equipped with pulsed ion deflectors 100 and 102 to prevent ions of mass-to-charge ratios different from the selected ions from being transmitted to the analyzer 24.

Figure 11:
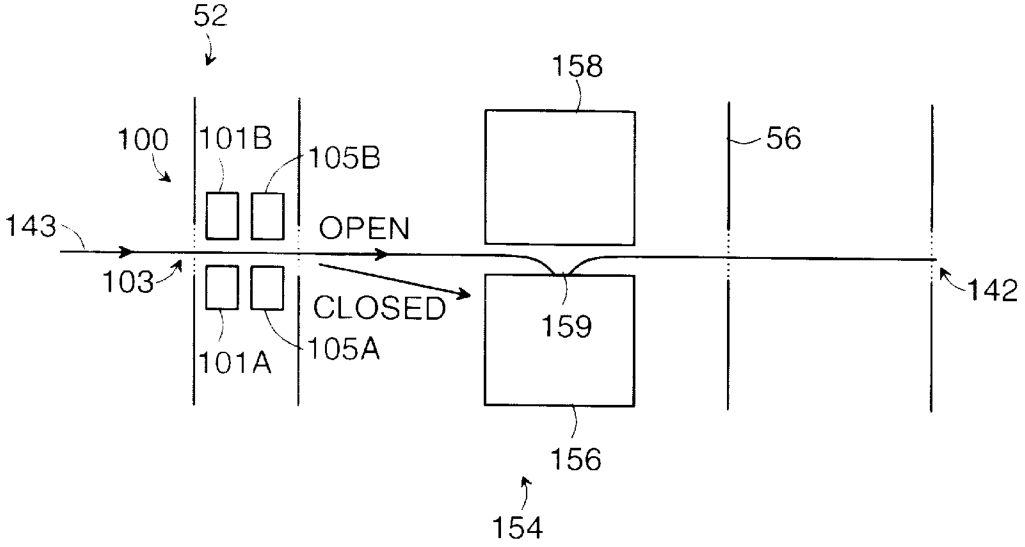
FIG. 11 is a schematic diagram of an embodiment employing collisions of ions with solid or liquid surfaces in the fragmentation chamber of the embodiment of the invention shown in FIG. 8.

Referring also to FIG. 11, one embodiment of the invention employs a surface-induced dissociation cell 154 in fragmentation chamber 18. In this embodiment, ions of interest are selected by pulsed ion deflector 52 and ions of other mass-to-charge ratios are deflected so that they do not enter the surface-induced dissociation cell 154. A potential difference is applied between electrodes 158 and 156 to deflect selected ions so that they collide with the surface 159 of electrode 156 at a grazing angle of incidence. Ions are energized by collisions with the surface 159 and caused to fragment. In one -embodiment, the surface 159 is coated with a high molecular weight, relatively involatile liquid, such as a perfluorinated, ether to facilitate fragmentation or to reduce the probability of charge exchange with the surface. The fragment ions are analyzed with the fragmentation chamber 18 acting as delayed extraction source for analyzer 24.

Figure 12:
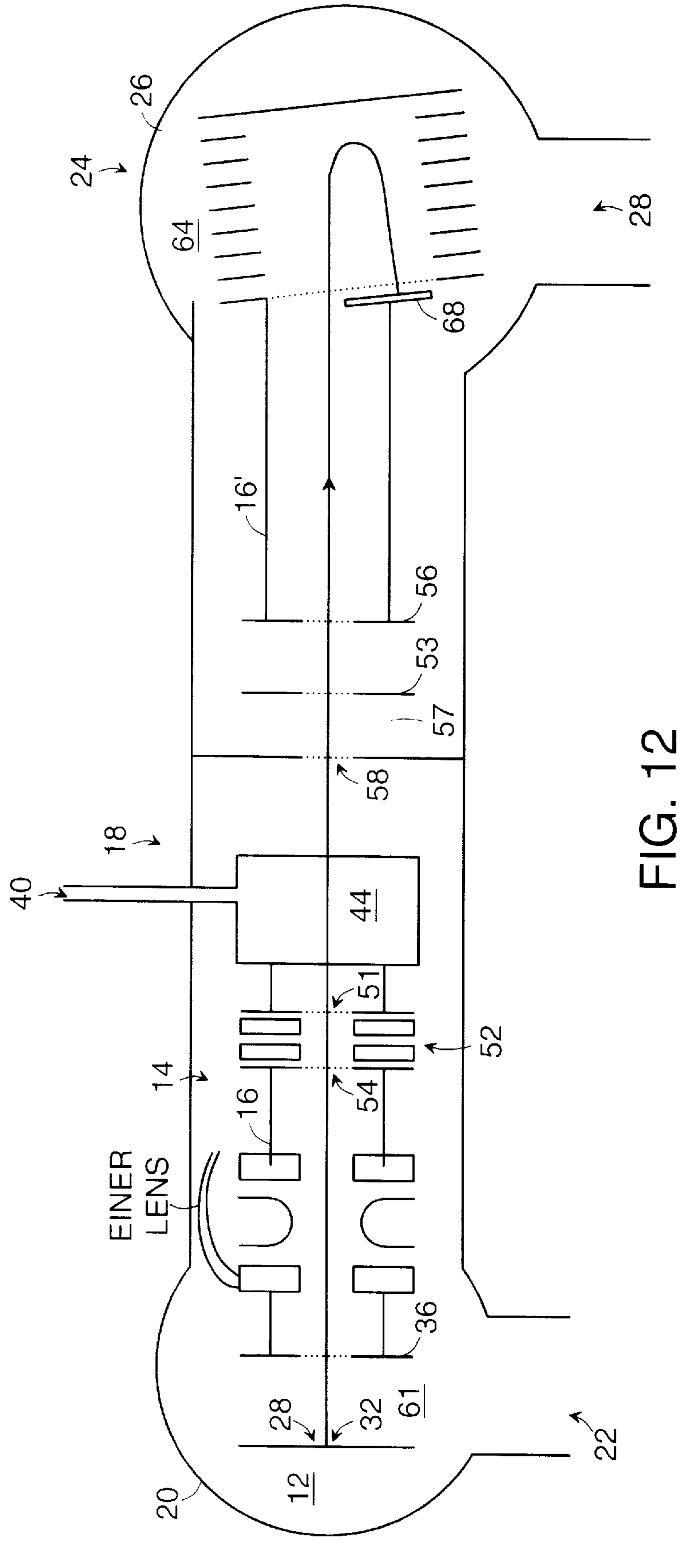
FIG. 12 is a schematic diagram of an embodiment of the invention of FIG. 1 wherein a timed ion selector, ion fragmentation chamber and pulsed ion generator are contained within the same vacuum housing.

Referring also to FIG. 12, in one embodiment, the timed ion selector 14 and ion fragmentation chamber 18 are enclosed in the same vacuum housing 20 as the pulsed ion generator 12. A pulsed ion extractor comprising the grid plate 53 and the fragmentor extraction grid 56 is located in vacuum housing 26 enclosing the analyzer 24. A small aperture 58 located in the nearly field-free space 57 between the fragmentation chamber 18 and grid plate 53 allows free passage of the ion beam but limits the flow of neutral gas. In one embodiment, an einzel lens is located between the pulsed ion generator 12 and the timed ion selector 14 to focus ions through aperture 58. In this embodiment, vacuum housing 19 (FIG. 2) and its associated vacuum pump are not required. In one embodiment, collision cell 44 within fragmentation chamber 18 is connected to ground potential as is the fragmentor extraction grid 56. Grid plate 53 is also held initially at ground, and switched to high voltage after ions of interest have reached the nearly field-free space 59 between the grid plate 53 and the fragmentor extraction grid 56.

Having described preferred embodiments of the invention, it will now become apparent of one of skill in the art that other embodiments incorporating the concepts may be used. It is felt, therefore, that these embodiments should not be limited to disclosed embodiments, but rather should be limited only by the spirit and scope of the following claims.

What is claimed is:

1. A tandem time-of-flight mass spectrometer comprising:

a) a pulsed source of ions that focuses ions of a predetermined mass-to-charge ratio range onto a focal plane;

b) a timed ion selector positioned at the focal plane to receive the focused ions from the pulsed sources of ions, wherein said timed ion selector permits only the ions of the predetermined mass-to-charge ratio range to travel to an ion fragmentor;

c) said ion fragmentor spaced apart from and in fluid communication with said timed ion selector;

d) a timed pulsed extractor spaced apart from and in fluid communication with said ion fragmentor, wherein the timed pulsed extractor accelerates the ions of the predetermined mass-to-charge ratio range and fragment ions thereof after a predetermined time; and e) a time-of-flight analyzer in fluid communication with the timed pulsed extractor, wherein said time-of-flight analyzer determines the mass-to-charge ratio of the fragment ions accelerated by the timed pulsed extractor.

2. The mass spectrometer of claim 1 further comprising a substantially field free region between the ion fragmentor and the timed pulsed extractor, said field free region of sufficient length to allow the ions of the predetermined mass-to-charge ratio range excited by interactions in the ion fragmentor to substantially complete fragmentation.

3. The mass spectrometer of claim 2 further comprising an ion guide positioned in the substantially field free region.

4. The mass spectrometer of claim 3 wherein said ion guide comprises a guide wire.

5. The mass spectrometer of claim 3 wherein said ion guide comprises a plurality of apertured plates with a positive DC potential applied to every other plate of said plurality of plates and a negative DC potential applied to the intervening plates of said plurality of plates.

6. The mass spectrometer of claim 3 wherein said ion guide comprises an RF excited multipole lens.

7. The mass spectrometer of claim 2 further comprising a grid positioned between the ion fragmentor and the timed pulsed extractor, said grid being biased to produce the substantially field free region.

8. The mass spectrometer of claim 1 wherein said timed ion selector comprises a drift tube and a timed ion deflector.

9. The mass spectrometer of claim 8 wherein said drift tube includes an ion guide.

10. The mass spectrometer of claim 9 wherein said ion guide comprises a guide wire.

11. The mass spectrometer of claim 9 wherein said ion guide comprises a plurality of apertured plates with a positive DC potential applied to every other plate of said plurality of plates and a negative DC potential applied to the intervening plates of said plurality of plates.

12. The mass spectrometer of claim 9 wherein said ion guide comprises an RF excited multipole lens.

13. The mass spectrometer of claim 8 wherein said timed ion deflector comprises a pair of deflection electrodes to which a potential difference is applied, said potential preventing ions from reaching the ion fragmentor except during the time interval in which ions within the predetermined mass-to-charge ratio range pass between the electrodes.

14. The mass spectrometer of claim 8 wherein said timed ion deflector comprises two pairs of deflection electrodes, wherein a potential difference is applied to the first pair of deflection electrodes to prevent ions with a mass-to-charge ratio lower than the predetermined mass-to-charge ration range from reaching the ion fragmentor and a potential difference is applied to the second pair of deflection electrodes to prevent ions with a mass-to-charge ratio higher than the predetermined mass-to-charge ratio range from reaching the ion fragmentor.

15. The mass spectrometer of claim 1 wherein said pulsed source of ions comprises a matrix-assisted laser desorption/ionization (MALDI) ion source with delayed extraction.

16. The mass spectrometer of claim 1 wherein said pulsed source of ions comprises an injector that injects ions into a field-free region and a pulsed ion extractor that extracts the ions in a direction that is orthogonal to a direction of injection.

17. The mass spectrometer of claim 1 wherein an energy of the ions entering the ion fragmentor is controlled by applying an electrical potential to said ion fragmentor.

18. The mass spectrometer of claim 1 wherein said ion fragmentor comprises a collision cell wherein ions are caused to collide with neutral molecules.

19. The mass spectrometer of claim 1 wherein said ion fragmentor comprises a photodissociation cell wherein ions are irradiated with a beam of photons.

20. The mass spectrometer of claim 1 wherein said ion fragmentor comprises a surface dissociation means wherein ions collide with a solid or liquid surface.

21. The mass spectrometer of claim 1 wherein said mass analyzer comprises a drift tube coupling said timed pulsed extractor to an ion detector.

22. The mass spectrometer of claim 21 wherein said drift tube includes an ion guide for increasing the efficiency of ion transmission.

23. The mass spectrometer of claim 22 wherein said ion guide comprises a plurality of apertured plates with a positive DC potential applied to every other plate of said plurality of plates and a negative DC potential applied to the intervening plates of said plurality of plates.

24. The mass spectrometer of claim 22 wherein said ion guide comprises an RF excited multipole lens.

25. The mass spectrometer of claim 21 wherein an ion mirror is interposed between said drift tube and said detector.

26. The mass spectrometer of claim 1 wherein said timed pulsed extractor comprises a delayed extraction ion source for said mass analyzer whereby ions are focused in time so that ions of each mass-to-charge ratio arrive at the detector within a narrow time interval independent of their velocity when exiting the ion fragmentor.

27. The mass spectrometer of claim 1 wherein said pulsed source, said timed ion selector, and said ion fragmentor are contained within a same vacuum housing.

28. A method for high performance tandem mass spectroscopy comprising the steps of:

a) producing a pulse of ions from a sample of interest;

b) focusing ions from the pulse that have a predetermined mass-to-charge ratio range into an ion selector;

c) activating the ion selector thereby selecting the focused ions having the predetermined mass-to-charge ratio range;

d) exciting the selected ions thereby fragmenting the selected ions to produce fragment ions;

e) changing an electrical potential on a timed pulsed extractor after a predetermined time to accelerate the fragment ions; and f) analyzing the fragment ions using time-of-flight mass spectrometry.

29. The method of claim 28 wherein the step of analyzing said fragment ions using time-of-flight mass spectrometry comprises analyzing said fragment ions using delayed extraction time-of-flight mass spectrometry.

30. The method of claim 28 further comprising the step of passing said excited selected ions through a nearly field-free region thereby allowing said excited selected ions to substantially complete fragmentation therein.

31. The method of claim 28 wherein the step of exciting said selected ions comprises colliding the with neutral gas molecules.

32. The method of claim 28 wherein the step of producing the pulse of ions comprises a method selected from the group consisting of: electrospray, pneumatically-assisted electrospray, chemical ionization, MALDI, and ICP.

33. A tandem time-of-flight mass spectrometer comprising:

a) a pulsed source of ions;

b) a timed ion selector positioned to receive ions from the pulsed source of ions, wherein said timed ion selector permits only the ions of a predetermined mass-to-charge ratio range to travel to an ion fragmentor;

c) said ion fragmentor being spaced apart from and in fluid communication with said timed ion selector;

d) a timed pulsed extractor spaced apart from and coupled to said ion fragmentor by a substantially field free region, wherein the timed pulsed extractor accelerates the ions of the predetermined mass-to-charge ratio range and fragment ions thereof after a predetermined time; and e) a time-of-flight analyzer in fluid communication with the timed pulsed extractor, wherein said time-of-flight analyzer determines the mass-to-charge ratio of the fragment ions accelerated by the timed pulsed extractor.

34. The mass spectrometer of claim 33 wherein the substantially field free region permits the ions of the predetermined mass-to-charge ratio range excited by interactions in the ion fragmentor to substantially complete fragmentation.

35. The mass spectrometer of claim 33 further comprising a grid positioned between the ion fragmentor and the timed pulsed extractor, said grid being biased to produce the substantially field free region.

36. The mass spectrometer of claim 33 wherein said timed ion selector comprises a drift tube and a timed ion deflector.

37. The mass spectrometer of claim 33 wherein said pulsed source of ions comprises an injector that injects ions into a field-free region and a pulsed ion extractor that extracts the ions in a direction that is orthogonal to a direction of injection.

* * * * *